STORAGE CAMERAS

Filed Jan. 28, 1955 3 Sheets-Sheet 1

INVENTOR
RUDOLF C. HERGENROTHER
BY Elmer J. Gorn
ATTORNEY

Jan. 13, 1959 R. C. HERGENROTHER 2,869,025

STORAGE CAMERAS

Filed Jan. 28, 1955 3 Sheets-Sheet 2

INVENTOR
RUDOLF C. HERGENROTHER
BY Elmer J. Gorn
ATTORNEY

Jan. 13, 1959 R. C. HERGENROTHER 2,869,025

STORAGE CAMERAS

Filed Jan. 28, 1955 3 Sheets-Sheet 3

INVENTOR
RUDOLF C. HERGENROTHER
BY Elmer J. Gorn
ATTORNEY

United States Patent Office 2,869,025

Patented Jan. 13, 1959

2,869,025

STORAGE CAMERAS

Rudolf C. Hergenrother, West Newton, Mass., assignor to Raytheon Manufacturing Company, Waltham, Mass., a corporation of Delaware Application January 28, 1955, Serial No. 484,662

5 Claims. (Cl. 315—11)

This invention relates to television type camera tubes in which an electron image of the televised scene is recorded on a storage screen which is later scanned by an electron beam to produce a signal representative of the recorded scene.

It is sometimes desirable to have a remotely controlled camera that can be made to produce an output, when desired, representing what was observed at some previous time. This invention provides a camera tube that can be readily used in this manner, as for instance, in monitoring dangerous experiments or industrial operations.

This is accomplished in one embodiment of the present invention by mounting a photo cathode at the face of the tube which emits electrons in a pattern of carrying intensity representative of the picture viewed and causes these electrons to impinge on the elements of a dielectric screen causing secondary emission. The secondary emission leaves the screen with a positive charge distributed in accordance with the views seen. This charge is scanned by a reading gun to produce a signal in much the same manner as disclosed in the U. S. Patent No. 2,547,638, to B. C. Gardner. In another embodiment the optical image is projected into the tube through a transparent electrode that may be a conductive coating on the face of the tube and through a transparent screen to a dielectric screen of the type that becomes conductive when exposed to light. The dielectric screen is given a uniform negative charge by being bombarded by electrons that pass through the openings in the storage screen and are repelled by a negative potential applied to the transparent conductive coating on the face of the tube to return the electron beam to the dielectric face of the storage screen. The screen is read by a beam of electrons coming through the openings in the screen under the attraction of a positive potential applied to the transparent electrode. The signal is obtained across a resistor connecting this electrode to the cathode of the gun.

Other and further advantages of this invention will be apparent as the description thereof progresses, reference being had to the accompanying drawings wherein.

Figure 1:
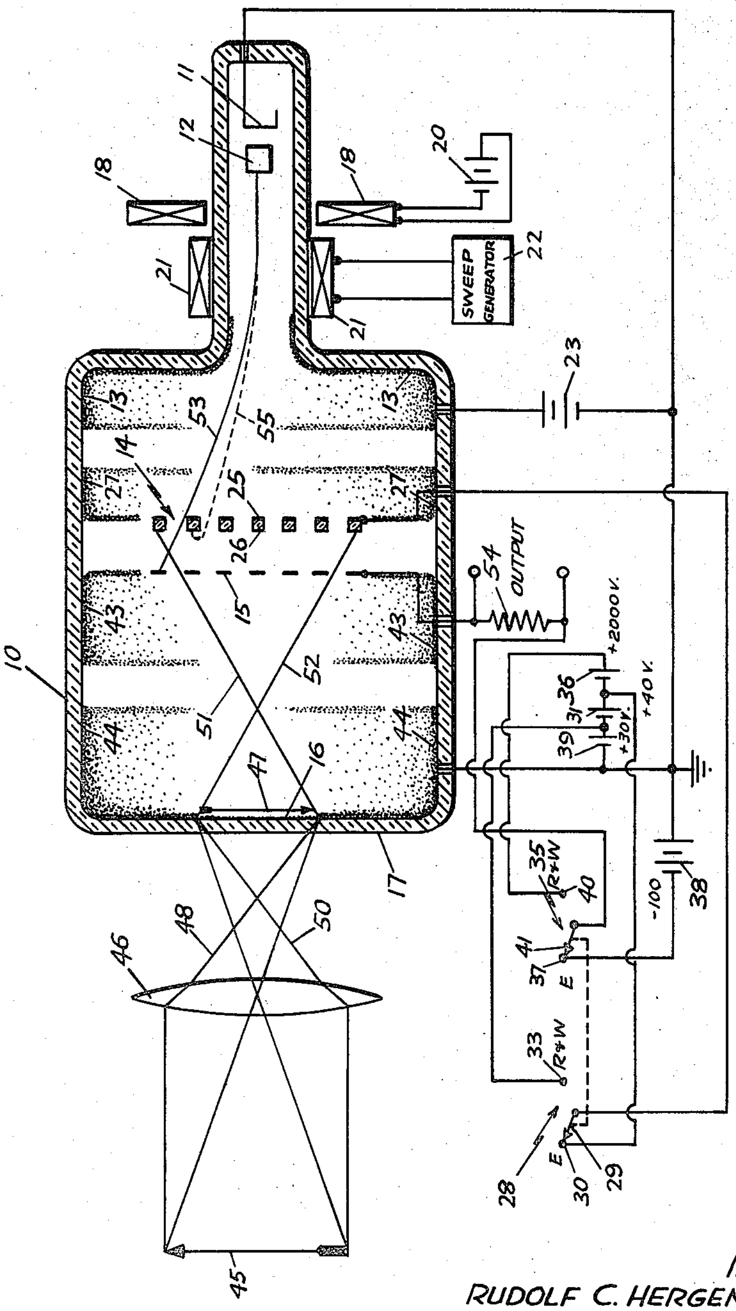
Fig. 1 is a schematic diagram of a circuit of one embodiment of the invention.

In Fig. 1 the reference numeral 10 designates the envelope of the camera tube which contains a cathode 11, a first anode 12, a second anode in the form of a conductive coating 13, a perforated storage screen 14, a reflecting and collecting screen 15 and a photo emissive coating 16 on the face 17 of the tube. The tube is also equipped with a focusing coil 18 supplied with current from a source 20. Electrostatic focusing or a permanent magnet could also be used for this purpose. There is also a set of deflection coils 21 supplied with deflection currents from a sweep generator 22. Electrostatic deflection could also be used for this purpose. Any type of scanning pattern could be used, but a television type raster is probably the most convenient. The second anode 13 is connected to a source 23 to maintain it at a positive potential with respect to the cathode 11. The storage screen 14 comprises a woven network of conductors or a punctured sheet of conductive material referred to as a conducting mesh 25 with a coating 26 of dielectric material, such as the fluorides of either barium or calcium, on the side towards the tube face referred to as the storage coating. The storage screen is mounted transverse to the longitudinal axis of the tube and connected to an annular ring of conductive material, which may be in the form of a coating 27 on the walls of the tube and is connected to the arm 29 of a switch 28, one of the contacts 30 of which is connected to a source 31 of positive potential below the critical potential of the storage material, that is, below the potential at which electrons striking the storage material will cause the same number of secondary electrons to be emitted from the storage material. In the case of a representative material having a critical potential of 50 v., this would be 40 volts, for example. A second contact 33 on the switch 28 is connected to a second source 39 of positive potential, for example, 30 volts. The first contact 37 on the switch 35 is connected to a source 38 of negative potential, 100 volts, for example. The second contact 40 on switch 35 is connected to a source 36 of positive potential greater than the critical potential of the dielectric material of the storage coating 26, for example, 2,000 volts. The arm 41 of the switch 35 is connected to the screen 15 that is most conveniently made of a perforated sheet of conductive material or a wire mesh connected through a ring 43 of conductive material, such as a conductive coating. The photoemissive coating 16 on the face 17 of the tube is connected through a conductive ring 44 to the cathode 11. The details of the construction of the electrodes, the method of mounting them in the tube envelope and the connections between them and the external circuit are similar to those for the tube described in the cited U. S. Patent to Gardner where they are described in greater detail.

In operation, light from an object 45 is focused by a lens 46 to form an image 47 on the photoemissive screen 16 as indicated by the lines 49 and 50 representing rays of light. The photoemissive surface 16 emits electrons in an intensity pattern representative of the image 47. With the arms of the switches 28 and 35 in the right-hand or read-and-write position, designated by an R and a W, the electrons are focused by the electron lens formed by the annular electrodes 43 and 44 onto the dielectric face of the storage screen 14 as shown by the lines 51 and 52. As the conductive mesh 25 of the storage screen 14 is now at a potential positive with respect to the photoemissive screen 16 and the first screen 15 at a potential of 2,000 volts with respect to screen 16, and the storage coating has been placed at the potential of the gun cathode 11 by an erase operation to be described, secondary emission will take place to an extent for each discrete area of the screen dependent on the rate at which electrons impinge on that area, and the storage screen will assume a charge distribution determined by the projected electron image, that is, less negative with respect to the conductive mesh for those areas that have been most intensively bombarded. In this position of the switches a beam of electrons, indicated by the line 53, is accelerated from cathode 11 through the conducting mesh 25 which has a positive potential with respect to the cathode in the order of 30 volts under the influence of the high positive potential on the screen 15. When the beam approaches a region of the storage screen having the maximum negative charge, it encounters a retarding field and few, if any, electrons get through. When the beam approaches a region of minimum negative charge, a region that has been heavily bombarded, a maximum number of electrons get through to the more positive first screen 15 and flow to the cathode 11 through the load resistor 54 to give an output signal proportional to the light intensity at that portion of the object corresponding to the portion of the storage screen that is being scanned by the beam 53 at that instant. The stored image is erased and the screen prepared to receive a new image by turning the switches to the left-hand position marked E. Here the screen 15 is made negative relative to the cathode 11 and the storage screen is placed at a potential with respect to the cathode that is lower than the critical voltage. The beam of electrons then passes through the storage screen and is turned back by the negative potential on the screen 15 and returned to the storage screen along a path, such as that indicated by the dotted line 55, where they bring the dielectric to the cathode potential ready to receive a new picture. The picture may be scanned by the read gun while a charge pattern is being laid down by the photo-cathode.

Figure 2:
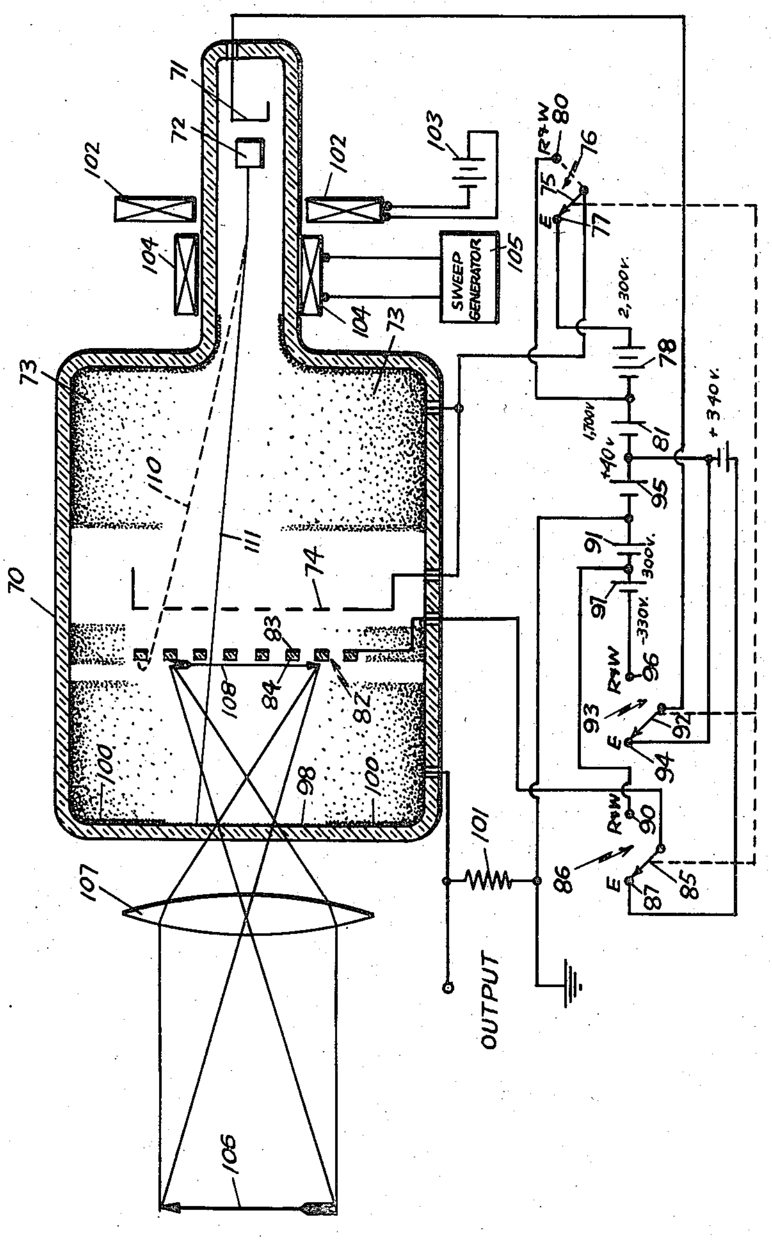
Fig. 2 is a schematic diagram of the circuit of a second embodiment of the invention.

A second embodiment of the invention is shown in Fig. 2 in which the reference numeral 70 designates the envelope of the tube that has a cathode 71 and a first anode 72. It also has a second anode 73 formed as a coating on the walls of the tube and a first screen 74 both connected to the arm 75 of a switch 76. The first contact 77 of this switch is connected to a source 78 of positive potential, for example, 2,300 volts. The second contact 80 of the switch is connected to a source 81 of positive potential, for example, 1,700 volts. There is a storage screen 82 again formed of a perforated conductive sheet or screen 83, but having a coating 84 of a material of the type that becomes a conductor when light falls on it, such as zinc sulfide, that is a photoconductive material. The conductive mesh 83 is connected to the arm 85 of a switch 86, the left-hand contact 87 of which is connected to a source 88 of positive potential, for example, 340 volts, and the right-hand contact 90 of which is connected to a source 91 of negative potential, for example, 300 volts. The cathode 71 is connected to the arm 92 of a switch 93, the left-hand contact 94 of which is connected to a source 95 of less positive potential than the sources 78 and 81, for example, 40 volts. Right-hand contact 96 of this switch is connected to the source 97 of greater negative potential than that connected to the contact 90 of the switch 86, for example, 330 volts. There is a transparent conductive coating 98 of a material such as stannous chloride on the face of the tube connected to the cathode 71 through a conductive coating 100, a load resistor 101 and either of the potential sources 91 and 81 or 95 depending upon the position of the switch arm 92. The tube 70 is equipped with a focusing coil 102 supplied with a current from a source 103 and vertical and horizontal deflection coils 104 supplied with deflection currents from the source 105. Again, the focusing and deflection may be accomplished by electrostatic means. In operation with the switches 76, 86 and 93 in the left-hand or erase position, designated by an E, the cathode 71 is at a potential positive with respect to the coating 98, but negative with respect to the first screen 74 and the storage screen 83. The result is that the beam of electrons, designated by the line 110, passes through openings in the screens 74 and 82 and is turned back by the opposing potential on the coating 98 to strike the dielectric coating 84 on the screen 82 to deposit a uniform negative charge.

In the writing operation, light from an object 106 is projected by a lens 107 onto the storage screen 82 through the face of the tube 70 and its transparent conductive coating 98 forming an image 108. As the light pattern of the image 108 falls on various parts of dielectric coating 84, it becomes conductive to an extent depending upon the intensity of the light impinging on that point or area. The result is that electrons deposited in the erase operation flow off into the screen 83 and the external circuit to an extent determined by the conductivity of that region of the storage screen to write the information in the form of a pattern of positive charges varying in intensity with the varying brilliance of the image. With the switches 76, 86 and 93 in the right-hand or read-and-write position, designated by the letters R and W, the cathode is at a negative potential with respect to the transparent conductive coating 98, but this potential is less negative with respect to the same electrode than that of the storage screen 83. The first screen 74 is highly positive with respect to the cathode 71 and the coating 98. The result is that an electron beam takes the path shown by the line 111 through an opening in the first screen and an opening in the storage screen to the conductive coating 98 on the face of the tube. As the beam passes through the opening in the storage screen 82, it encounters a negative field of an intensity determined by the original negative charge still remaining on that area of the storage screen after the conduction determined by the intensity of light that has fallen on them. The quantity of electrons getting through is determined by the magnitude of this charge. The electrons that get through are collected by the transparent coating 98 and cause a current to flow through the resistor 101 that is directly proportional to the intensity of the light that fell on the corresponding portion of the storage screen.

Figures 3, 4:
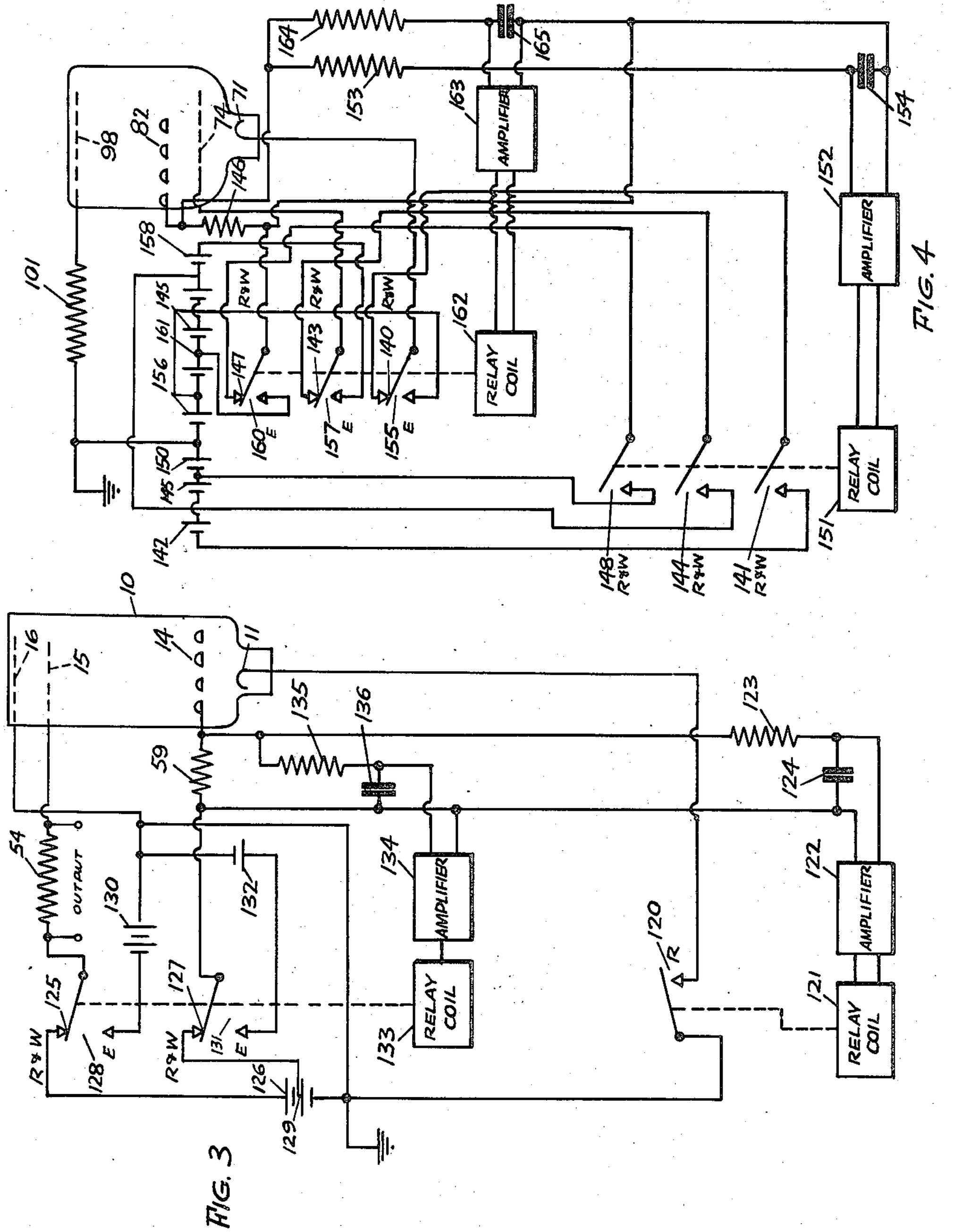
Fig. 3 is a schematic diagram of the circuit for automatically switching the potentials applied to the electrodes of the embodiment of Fig. 1.
Fig. 4 is a schematic of a circuit for automatically switching the potentials applied to the electrodes of the embodiment of Fig. 2.

Fig. 3 shows how the tube of Fig. 1 can be operated automatically to adjust the potentials for reading the stored information whenever there is a significant change in this information, as indicated by a flow of current through a resistor connected in series with the storage screen and to erase this information when there is a greater change. This voltage is integrated in an integrating circuit and, when it becomes of an amplitude indicating that a substantial change has taken place, it energizes the coil of a relay after amplification if necessary. The relay operates contacts that apply the necessary potentials to the electrodes for the reading operation. A similar integrating circuit and relay operate contacts that initiate the erasing operation when a considerably larger change has taken place.

In Fig. 3 the cathode 11 is connected through normally open contacts 120 to the negative terminal of source 126. The contacts 120 are controlled by a relay coil 121 in the output of an amplifier 122 that is connected through an integrating circuit comprising a series resistor 123 and a shunt capacitor 124 across a resistor 59 connected to the storage screen 14. The relay 121 is made to have a slow release time so that it will remain energized during one scanning cycle to permit the stored information to be read. The screen 15 is connected through the load resistor 54 and normally closed contacts 125 to a source of positive potential 126. In addition, the screen 15 is connected through resistor 54 and over normally open contacts 128 to a source of negative potential 130. The storage screen 14 is connected through a resistor 59 and normally closed contacts 127 to a source 129. The storage grid 14 is also connected through a resistor 59 over normally open contacts 131 to a source 132 of positive potential. The contacts 125, 128, 127 and 131 are operated by the coil 133 of a second slow release relay connected in the output of an amplifier 134 that is connected through a second integrating circuit comprising a series resistor 135 and a shunt capacitor 136 across the series resistor 59. The integrating circuit comprising resistor 123 and a capacitor 124 has a shorter time constant than the integrating circuit comprising resistor 135 and capacitor 136 so that any significant change in the charge pattern on the storage screen will cause the relay 121 to operate, completing the cathode circuit and initiating the read operation as described above. When still greater changes have occurred on the storage screen, the relay 133 is operated and the erase operation takes place as described above. When the erase relay 133 is operated, the electrodes are disconnected from the sources of appropriate potentials for the read operation before being connected to the potentials appropriate for the erase operation.

In Fig. 4 the cathode 71 is connected over a normally closed set of contacts 140 and a normally open set of contacts 141 to a source of negative potential 142. The first screen 74 is connected over normally closed contacts 143 and normally open contacts 144 to a source 145 of positive potential. The storage screen 82 is connected through a resistor 146 and over normally closed contacts 147 and normally open contacts 148 to a source 150 of negative potential. The contacts 141, 144 and 148 are operated by a relay coil 151 connected to the output of an amplifier 152 connected to the output of an integrating circuit comprising a series resistor 153 and a shunt capacitor 154 that is connected across the resistor 146. The cathode 71 is also connected over normally open contacts 155 to a source of potential 156. The first screen 74 is also connected over normally open contacts 157 to a source 158 of high positive potential. The storage screen 82 is also connected through resistor 146 and over normally open contacts 160 to a source 161 of a lesser positive potential. The contacts 155, 157 and 160 are operated by a relay coil 162 connected to the output of an amplifier 163 that receives the output of an integrating circuit comprising a series resistor 164 and a shunt capacitor 165 connected across the resistor 146.

The integrating circuit comprising series resistor 153 and shunt capacitor 154 has a shorter time constant than the integrating circuit comprising series resistor 164 and shunt capacitor 165 so that the read operation will be initiated by any significant change in the photoelectric current flowing from the storage screen due to a change in the charge pattern while the erase operation will not be initiated until there has been a considerably greater change. It is apparent that a change sufficient to operate the erase relay 162 will also operate the relay 152 that initiates the read operation. To prevent both sets of potentials being applied simultaneously, normally closed contacts connected in series with the normally opened contacts on the read relay are provided so that the read circuit will be broken when the erase circuit is energized.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In an electronic charge storage photoelectric device, a perforated storage screen having an electrically conductive side and a dielectric side of photoconductive material, means to produce a charge pattern on said dielectric side in accordance with a received light image comprising a transparent conductor in a plane parallel to said screen and between said storage screen and the light source and a second screen in a plane parallel to the first screen and on the conductive side, and means providing an electron beam to scan said storage screen from the conductive side to produce a voltage proportional to the charge on discrete areas of the storage screen comprising an electron gun and acceleration electrodes on the conductive side of said storage screen.

2. In an electronic charge storage photoelectric device, a perforated storage screen having an electrically conductive side and a dielectric side of photo-conductive material adapted to produce a charge pattern in accordance with a received light image, a transparent electrically conductive electrode arranged in a plane parallel to and on the dielectric side of said screen, and means providing an electron beam to scan said screen from the conductive side to produce a voltage proportional to the charge on discrete areas of the screen comprising an electron gun and accelerating electrodes on the conductive side of the screen and an impedance connected to the transparent electrical conductor.

3. In an electronic charge storage photoelectric device, a perforated storage screen having an electrically conductive side and a dielectric side of photo-conductive material adapted to produce a charge pattern in accordance with a received light image, a transparent electrically conductive electrode arranged in a plane parallel to and on the dielectric side of said screen, means providing an electron beam to scan said screen from the conductive side to produce a voltage proportional to the charge on discrete areas of the screen, and means for erasing said charge pattern comprising said electron gun and accelerating electrodes on the conductive side of said screen, and means to make said transparent electrode on the dielectric side of said screen negative with respect to the said gun and so to cause the beam to curve back onto the dielectric side of said screen to give said screen a uniform negative charge.

4. In an electronic charge storage photoelectric device, a perforated storage screen having an electrically conductive side and a dielectric side of photo-conductive material adapted to produce a charge pattern in accorddance with a received light image, a transparent electrically conductive electrode arranged in a plane parallel to and on the dielectric side of said screen, means providing an electron beam to scan said screen from the conductive side to produce a voltage proportional to the charge on discrete areas of the screen comprising an electron gun and accelerating electrodes on the conductive side of the screen and an impedance connected to the transparent electrical conductor, and means for erasing said charge pattern comprising said electron gun and accelerating electrodes on the conductive side of said screen, and means to make said transparent electrode on the dielectric side of said screen negative with respect to the said gun and so to cause the beam to curve back onto the dielectric side of said screen to give said screen a uniform negative charge.

5. In an electron charge storage photoelectric system, a perforated storage screen having an electrically conductive side and a dielectric side, photoconductive means to produce a charge pattern on said dielectric side in accordance with a received light image, means providing an electron beam to scan said screen from the conductive side comprising a cathode, accelerating anodes, a reflecting and collecting electrode and a first set of means to apply potentials appropriate to cause said scanning beam to penetrate the storage screen and return to the dielectric side of the storage screen, a second set of means to apply potentials appropriate to cause said scanning beam to penetrate through the storage screen and be collected by the collecting electrode, and means to select between the first and second electron beam controlling means in response to changes in the charge distribution on the storage screen.

References Cited in the file of this patent

UNITED STATES PATENTS

| | | |
|---|---|---|
| 2,416,720 | Teal | Mar. 4, 1947 |
| 2,547,638 | Gardner | Apr. 3, 1951 |
| 2,614,235 | Forgue | Oct. 14, 1952 |
| 2,652,515 | McGee | Sept. 15, 1953 |
| 2,713,647 | Hergenrother | July 19, 1955 |
| 2,713,648 | Gardner | July 19, 1955 |
| 2,717,976 | Baker | Sept. 13, 1955 |
| 2,753,483 | Lubszynski et al. | July 3, 1956 |
| 2,755,401 | Tirico | July 17, 1956 |
| 2,755,408 | Theile | July 17, 1956 |
| 2,765,422 | Henderson | Oct. 2, 1956 |
| 2,787,724 | Webley | Apr. 2, 1957 |

UNITED STATES PATENT OFFICE
CERTIFICATE OF CORRECTION

Patent No. 2,869,025

January 13, 1959

Rudolf C. Hergenrother

It is hereby certified that error appears in the printed specification of the above numbered patent requiring correction and that the said Letters Patent should read as corrected below.

Column 1, line 28, for "carrying" read -- varying --; column 2, line 48, for "lines 49 and 50" read -- lines 48 and 50 --.

Signed and sealed this 23rd day of June 1959.

(SEAL)

Attest:

KARL H. AXLINE

Attesting Officer

ROBERT C. WATSON

Commissioner of Patents